Sept. 9, 1952 W. A. STONE 2,609,693
GYROSCOPIC SLAVING APPARATUS
Filed Sept. 9, 1949
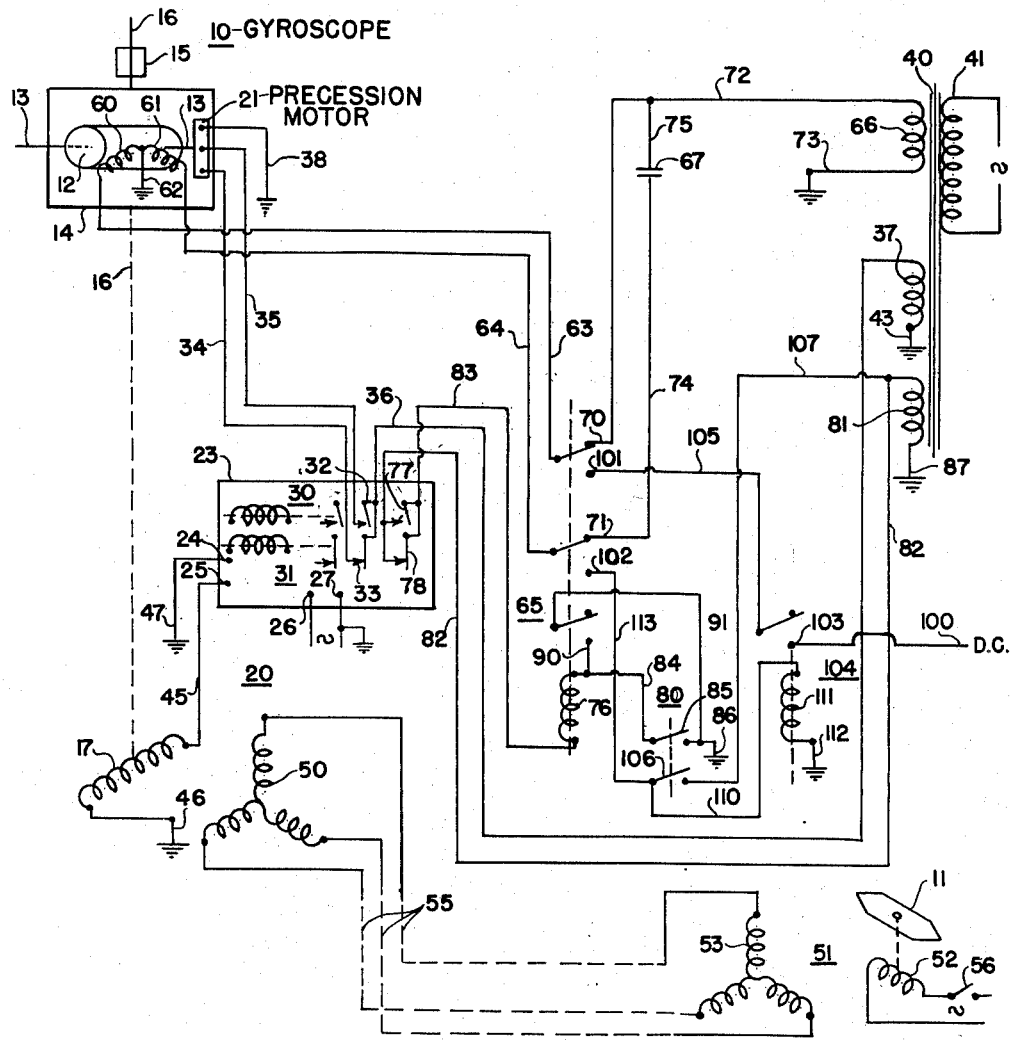
Inventor
WAYNE A. STONE
George H Fisher
Attorney Patented Sept. 9, 1952

2,609,693

UNITED STATES PATENT OFFICE 2,609,693

GYROSCOPIC SLAVING APPARATUS

Wayne A. Stone, St. Louis Park, Minn., assignor to Minneapolis-Honeywell Regulator Company, Minneapolis, Minn., a corporation of Delaware Application September 9, 1949, Serial No. 114,737

13 Claims. (Cl. 74—5.7)

The present invention relates to slaving apparatus between a compass and a gyroscope, and more particularly to stabilized directional indicators or stabilizing directional components as are commonly used in steering apparatus and in automatic pilots for air and water craft and the like.

In stabilized directional indicators or steering components, the gyroscope has a tendency to wander due to its inherent friction. Therefore, a gyroscope cannot be used alone as a directional reference unless it is periodically reset. Such a unit is generally slaved to a magnetic compass to keep the gyroscope from wandering, the compass, through a suitable deviation resolver, controlling the precession of the gyroscope to correct for such wandering. In such apparatus, the precession rate of the gyroscope is kept low so that the gyroscope will not respond to oscillations of the compass but will only be precessed on steady deviations.

When a slaving apparatus is initially placed into operation, as for example at the start of a flight, or when the slaving apparatus is established after a period of unslaved operation of the gyroscope, there is usually a wide deviation between the compass and gyroscope. With the normal rate of precession of the gyroscope, the time required to effect alignment between the gyroscope and the compass is undesirably large. Therefore, the present invention is designed to provide a novel means of reducing the time required for alignment of the gyroscope and compass under such circumstances. With the apparatus of the present invention, the gyroscope retains its normal rate of precession for normal operation and where required an auxiliary circuit is initiated to brake the speed of rotation of the gyroscope to a point where a faster rate of control is obtained from the precession motors.

Another object of this invention is to provide a slaving apparatus in which the effectiveness of the gyroscope to align itself with the compass is increased under certain conditions.

It is also an object of this invention to provide a slaving apparatus in which a means for increasing the speed of alignment between the components of the apparatus is capable of manual initiation only where there is a need for operation of the apparatus and is automatically terminated upon satisfaction of the need for the operation of the apparatus.

It is further an object of this invention to provide in a gyroscope compass slaving apparatus a braking circuit by which a D. C. source is connected to a winding of the rotor of the gyroscope and a holding circuit to sustain the braking circuit is completed by means of which a voltage generated in another winding of the rotor energizes and maintains the holding circuit as long as the rotor is rotating above a predetermined speed.

It is still further an object of this invention to provide in a slaving apparatus for a gyroscope and a compass, a means for braking the speed of rotation of the gyroscope to decrease the time required for alignment of the compass and the gyroscope, this means being automatically controlled to terminate the braking of the gyroscope at a predetermined speed so that stability of the gyroscope will be retained.

It is also an object of this invention to provide in a gyroscope controlling apparatus a two-speed control for positioning the gyroscope, one of which is operative normally and the other of which is manually initiated and automatically terminated upon the lack of need for controlling the gyroscope.

These and other objects of this invention will become apparent from a reading of the attached description together with the drawings, in which:

The figure is a circuit diagram of the gyroscope controlling apparatus of the subject invention, and Referring to the figure, it will be seen that the slaving apparatus of the subject invention comprises essentially a gyroscope 10 and a magnetic compass 11 together with connecting circuit means to accomplish the slaving operation. The combination of a gyroscope and compass with a slaving circuit is commonly known as stabilized direction indicators or compass stabilized directional units, this combination having numerous applications in the field of control of air and water craft either for an indicating or a controlling function. While the subject disclosure relates to azimuth directional indication and slaving through a directional gyroscope, it should be noted that the slaving apparatus of the subject invention can be applied to stabilization of a gyroscope about other axes than that of azimuth and this disclosure should be considered as illustrative only.

The directional gyroscope of the subject slaving apparatus is of the conventional type and includes a casing 12 which houses a rotor (not shown) supported for rotation about a horizontal axis within the casing. While it is not shown, it should be assumed that the rotor of the gyroscope is of the type shown in the patent to J. F.

Schoeppel 2,438,621 dated March 30, 1948. The spinning means of the rotor is a conventional two-phase induction motor which is connected as a conventional split phase induction motor energized from a single phase source. The drawing shows the windings of the induction motor field diagrammatically within the casing 12 which is connected into the subject slaving apparatus in a manner to be later described. Casing 12 which houses the rotor and its spinning means or motor is carried by trunnions 13 mounted in a gimbal ring 14, the bearings for the trunnions being omitted from the disclosure since they form no part of this invention. The gimbal ring 14 is in turn mounted in and journaled by bearings 15 (only one of which is shown) through its trunnions 16. The lower trunnion of the gimbal ring is extended and carries a rotor element 17 of a signal generator 20 which will be more fully described as the disclosure proceeds. The bearings 15 journaling the gimbal ring 14 are to be assumed as mounted on the frame of the gyroscope for the purpose of pivoting the gyroscope in a vertical axis for displacement in azimuth.

Gyroscope 10 is further provided with a precession motor 21 which may be a two-phase induction motor of the conventional type. Although not shown in the drawings, the precession motor 21 is assumed to include a rotor of the squirrel cage type carried on the trunnions 13 which mount the rotor casing 12 of the gyroscope. A cooperating stator (also not shown) of precession motor 21 is mounted on the gimbal ring 14 to cooperate with the squirrel cage rotor element of the precession motor 21 applying a torque to casing 12 about the axis formed by trunnions 13 to cause precession of the gyroscope about an axis formed by trunnions 16. Like the spinning motor or means of the gyroscope, the precession motor 21 is assumed to be connected as a split-phase capacitor type induction motor in the manner shown in the Keeler Patent 2,272,914 issued February 10, 1942.

Precession motor 21 is controlled through a compass amplifier 23 of the type shown in the patent to A. P. Upton 2,243,534 dated July 8, 1947. Compass amplifier 23 includes an A. C. signal input at terminals 24, 25 and an A. C. power input at terminals 26, 27. Compass amplifier 23 also includes a pair of discriminating relays 30, 31 which are alternately operated depending upon the phase relationship between the signal input and the power input as is shown in the Upton patent referred to above. The relays 30, 31 have a pair of contacts 32, 33 respectively which, similar to the above named Keeler patent, connect the windings of the split-phase induction field of the precession motor 21 and its condenser in one manner or another to vary the direction of energization and hence the direction of the rotating flux field of the precession motor, the condenser being assumed to be located in the field of motor 21. Conductors 34, 35 connect the windings of the precession motor 21 to the relays 30, 31, and a conductor 36 common to one contact of each relay connects the relays 30, 31 to a secondary winding 37 of a transformer 40, the primary winding 41 of which is energized from the ship's alternating current source. One extremity of the secondary winding 37 is grounded such that a complete circuit is obtained from the secondary winding through conductor 36, the relays 30, 31, one or the other of conductors 34, 35 depending upon which relay is closed, to the windings of the precession motor 21 which are grounded at a common point 38.

The discriminating operation of the relays 30, 31 which control the direction of the rotating flux field of the precession motor 21 and hence direction of its applied torque is controlled by the compass amplifier 23 as it responds to the phase relationship of the power and signal input. The power terminals 26, 27 are energized from the A. C. ship's source. The signal terminals 24, 25 are connected to the single phase winding 17 of the signal generator or transformer 20 from which the signal voltage is supplied. Terminal 25 of amplifier 23 is connected to winding 17 by means of a conductor 45 and the opposite extremity of winding 17 is grounded at 46. Signal input terminal 24 is grounded at 47 to complete the circuit between the single-phase winding and the input terminals of amplifier 23.

Signal transformer 20 includes in addition to the single-phase winding on the rotating element 17, a three-phase winding 50 connected in a standard Y connection. As was previously noted the single-phase winding 17 is carried on the lower trunnion 16 of the gimbal ring 14 of gyroscope 10. The three-phase Y connected winding is stationarily mounted with respect to the movable portions of the gyroscope. This three-phase winding 50 of signal transformer 20 is connected to a signal generator 51 carried by the magnetic compass 11. Signal generator 51 is similar in construction to signal transformer 20 and includes a single-phase winding 52 and a three-phase stator winding 53 connected in Y-connection. Single-phase rotating winding 52 of generator 51 is mounted on the shaft of the compass 11 to be rotated therewith relative to the winding 53 which is stationary with respect to the movable portion of the compass. The three-phase windings 50, 53 of signal transformer 20 and signal generator 51 are connected by a plurality of conductors 55 which connect like extremities of the windings to one another. The single-phase winding 52 is energized from a ship's source of A. C. supply through a switch 56; the purpose of which will be later noted. The synchronous generator 51 and synchronous transformer 20 together constitute a differential means known as a synchronous system or a resolver. Upon disalignment between the compass 11 and gyroscope 10 and when the winding 52 is energized from the single-phase ship's source through switch 56, the synchro system or resolver will transmit a signal output voltage at winding 17 which output signal is variable in phase and magnitude. This output signal is supplied to the compass amplifier 23 through the input signal terminals 24, 25 to control the operation of the discriminating relays 30, 31 of the amplifier.

The operation of the synchro system or resolver is conventional, the voltage being supplied to winding 52 will be transmitted to the three-phase windings 53 in varying degrees dependent upon the relative position of the single-phase winding with the three-phase winding. These voltages in the three-phase stator element of the synchronous generator 51 are supplied to the three-phase stator element 50 of signal transformer 20 where they induce in the single-phase winding 17 an output signal which is proportional to the relative displacements between the two single-phase windings. This signal which controls the operation of the relays 30, 31 determines in effect the direction in which the torque of the precession motor 21 is to be applied. Relays 30, 31 through the contacts 32, 33 energize the windings of the induction motor field of precession motor 21 from the single-phase source of secondary winding 37 to cause precession of the gyroscope 10 in a direction to align the compass 11 and gyroscope 10, or the single-phase winding 17 with the single-phase winding 52 of the transmitter and generator respectively. Precession of the gyroscope through the operation of the precession motor 21, however, is dependent upon rigidity of the gyroscope which is obtained through rotation of the rotor of the gyroscope.

The rotor of the gyroscope, as noted above, is actuated by an induction motor of a split-phase type, a schematic disclosure of the windings of the rotor being shown and numbered 60 and 61. This induction motor is similar to the induction motor field of the precession motor 21, the windings 60, 61 being grounded at their common point, as at 62. The windings 60, 61 are connected by conductors 63, 64 through a switch or relay 65 to a secondary winding 66 of transformer 40, this secondary winding supplying a single-phase source of power. The rotor of the gyroscope is designed for a single direction of rotation and is not reversible. A condenser 67 is connected in series with the winding 61 and the source of power while the winding 60 is directly connected to the source of power to give a conventional split-phase master type induction motor circuit. Switch 65 through which the rotor is energized, serves to disconnect the secondary winding 66 of transformer 40 and the condenser 67 from the rotor winding as will be later noted. In the deenergized position, switch 65 causes a pair of normally closed contacts 70, 71 to connect the windings 60, 61 of the rotor induction motor to the condenser 67 and secondary winding 66 of transformer 40 through the following circuit: secondary winding 66 of transformer 40, conductor 72, normally closed contact 70 of switch 65 which includes the stationary and movable portion of this contact, conductor 63 to winding 60, ground connection 62 to a ground connection 73 of secondary winding 66; and secondary winding 66, conductor 72, conductor 75, condenser 67, conductor 74, normally closed contacts 71 of switch 65 which includes the movable and stationary portions of this contact, conductor 64, winding 61, ground 62, to ground connection 73 of secondary winding 66.

The switch or relay 65 is controllably positioned by an electromagnet the coil of which is shown schematically at 76. In its deenergized position, the normally closed contacts 70, 71, switch 65 maintain the A. C. energization circuit for the gyroscope rotor as outlined above. The coil 76 of switch 65 is energized through a pair of contacts 77, 78 of relays 30, 31 respectively of compass amplifier 23 which are connected in series with the coil 76 and a momentary manually operated switch 80 to control the energization of the coil 76 from a single-phase source of power supplied by a secondary winding 81 of transformer 40. This circuit is as follows: secondary winding 81, conductor 82, contacts 77, 78 of compass amplifier 73, to a conductor 83, coil 76, conductor 84, switch blade 85 of momentary switch 80, to a ground connection 86 and a ground connection 87 of secondary winding 81. Relay or switch 65 is thus energized through the above circuit from transformer secondary 81 when manual switch 80 is closed closing the contact or switch blade 85 and when one or the other of the relay contacts 77, 78 of relays 30, 31 of compass amplifier are closed. When energized, the normally closed contacts of switch 65 are opened and hence the circuit for the energization of the gyro rotor from the transformer secondary 66 is broken at the normally closed contacts 70, 71. A normally open contact 90 of switch 65 is closed when the switch 65 is energized and the holding circuit is established for the switch 65 around the momentary switch blade 85 through this contact. This holding circuit merely shunts out the momentary contact switch blade 85 by means of a conductor 91 connected to the ground connection 86 and through the normally closed contact 90 of switch 65 to conductor 84. Assuming one or the other of the relays 30, 31 of the compass amplifier to be operated, the momentary contact of switch blade 85 of switch 80 will be shunted out of the energization circuit for switch 65 by means of the above described holding circuit when the contacts of switch 65 move to their energized positions closing their normally open contacts. In this manner the relay 65 once energized will remain energized until the relays 30, 31 of compass amplifier 23 are both deenergized.

The switch of relay 65 in addition to performing the function of disconnecting the rotor windings from their A. C. source when it is energized, further connect a D. C. source 100 to the rotor winding 60 in a circuit which will be later described. As switch 65 is energized, a pair of normally open contacts 101 and 102 respectively are closed, these contacts having a common movable element with the normally closed contacts 70, 71 and being connected to conductors 63, 64 common to the rotor windings 60, 61. The D. C. supply 100 is connected to the winding 60 through a normally open contact 103 of a relay 104 which is connected to the normally open contact 101 of relay 65 by means of a conductor 105 and through the normally open contact 101, the conductor 63 to the winding 60. Although not shown in the drawing, the D. C. source is assumed to have its negative terminal grounded such that the circuit through the winding 60 is complete through the ground connection 62 to the grounded D. C. source. The relay 104 whose normally open contact 103 controls the energization of winding 60 from the D. C. source is provided for the purpose of disconnecting the D. C. source from said rotor winding under certain conditions independent of the operation of relay 65. Relay 104 is also energized initially from the secondary winding 81 of transformer 40 through a second switch blade 106 of momentary switch 80 in a circuit as follows: secondary winding 81, conductor 107, switch blade 106 of momentary switch 80, conductor 110, relay coil 111 of relay 104, ground connection 112, to ground connection 87 of winding 81. The switch blades 106 and 85 of momentary switch 80 are mounted for ganged operation such that they operate simultaneously although electrically independent of one another. Thus when the momentary switch 80 is made, the relay 104 will be energized to close its normally open contact 103 and the switch or relay 65 will be energized dependent upon the energization of one or the other of relays 30, 31 of compass amplifier 33 to disconnect the rotor from its A. C. source and complete the energization to the D. C. source 100.

Since the operation of switch 80 is intended to be momentary only, that is its switch blades 85 and 106 are biased to an open position, the energization of relay 104 from the secondary winding 81 of transformer 40 will similarly be momentarily dependent upon the position of switch blade 106. A holding circuit for this relay is provided which instead of shunting out the switch blade 106, is one which connects the relay coil 111 to a new source of power such that the relay 104 will remain energized as long as the new source of power is present. In this respect the relay coil 111 is connected through the conductor 110 to a conductor 113 connected to the normally open contacts 102 of switch 65. The normally open contact 102 as noted above, has a common movable element with the normally closed contact 71 and is connected to the conductor 64 leading to the winding 61 of the rotor induction motor. Since the opposite extremity of winding 61 and the opposite extremity of coil 111 are grounded, this circuit will be complete whenever relay 65 is energized.

Thus when relay 65 is energized through the manual momentary switch 80 under control of the relays 30, 31 of the compass amplifier 23, the A. C. source from the secondary winding 66 of the transformer 40 will be disconnected from the winding 60, 61 and the D. C. source 100 will be connected through the normally open contacts of relays 104 and 65 to the winding 60 of the rotor induction motor. Similarly the windings 61 will be connected in circuit with the winding 111 of relay 104. The D. C. source when applied to the winding 60 of the rotating rotor will cause a dynamic braking effect upon the rotor, and the direct current flowing in the winding 60 together with the rotation of the rotor caused by its angular momentum will generate in winding 61 an A. C. signal which will be transmitted to the winding 111 energizing the same. This winding which was initially energized through the switch blade 106 of manual switch 80 from the secondary winding 81 of transformer 40 will thus be held in its energized position from the current generated in the rotor winding 61 even though the momentary switch contact is opened cutting off the A. C. supply from the secondary winding 81. The voltage generated in the winding 61 will be dependent upon speed of rotation of the rotor since the D. C. supply is fixed and as the dynamic braking effect slows the rotation of the rotor, the voltage output of winding 61 to the coil 111 of relay 104 will correspondingly be decreased. As the voltage output of winding 61 drops below the normal drop-out voltage of the relay 104, this holding circuit will become ineffective and will disconnect the D. C. supply from the rotor winding 60 through the deenergization of relay 104. At this point dynamic braking action caused by the D. C. supply to the rotor winding 60 will be terminated and the rotor will spin freely being slowed down only by inherent friction and windage. The relay 104 is designed to have a voltage drop-out such that the speed of the rotor of the gyroscope will not be braked beyond a particular speed of rotation at which the operation of the precession motors will have the greatest effect. In this manner the rigidity of the gyroscope will be retained during the rapid precession operation of the slaving apparatus and upon resumption of normal operation of the slaving apparatus the gyroscope can be brought up to normal operating speed in a shorter period of time.

Operation

The operation of this slaving apparatus is based on the known principle that the effect of the precession motors can be increased by decreasing the angular momentum or speed of rotation of the gyroscope rotor mass. The less rigid the gyroscope is inherently, the greater the effect of the torque of the precession motors becomes.

Under normal operation the slaving apparatus is largely conventional. With the resolver circuit energized, any variance or disalignment between compass and gyroscope will be evidenced by a signal on the rotor winding 17 of the signal transformer 20 which signal will control the operation of the compass amplifier 23 and its associated discriminating relays. These relays in turn control the energization of the precession motor 21 to cause precession of the gyroscope at a normal low rate which is not subject to oscillation of the compass element but responds only to the steady-state deviations. Under normal slaved operation no wide degree of disalignment will be present since the resolver circuit working through the compass amplifier and precession motor will continuously correct for any wandering of the gyroscope precessing or slaving it to the compass. Under such circumstances, there is no need for operation of the remaining portion of the apparatus.

Assume now that for an extended period during the flight or voyage that the gyroscope be operated in an unslaved condition, that is with the resolver circuit deenergized. Such unslaved operation of a directional indicator or a directional component of a steering apparatus is not unknown or unusual since compass error at extreme northern and southern latitudes is highly disadvantageous and best overcome by such unslaved operation. After such a period of operation when the slaving apparatus is again initiated the time required for realignment of the gyroscope and compass would ordinarily be another undesirable factor. In the present invention rapid alignment is obtained merely by engaging the momentary switch 80 which energizes the relay 65 and 104 to disconnect the induction motor field of the rotor from its A. C. source and connect the winding 60 of this field to the D. C. source 100. With the relays thus operated, the dynamic braking of the rotor is initiated and the rotor speed is decreased, thereby increasing the effectiveness of torque motors in realigning the gyroscope with the compass. As the D. C. is applied to the rotor winding 60, a voltage is generated in the rotor winding 61 which will maintain the relay 104 energized after the momentary switch 80 is opened. As noted above the relay 65 is held closed by means of the holding circuit through the normally open contact 90 of relay 65, this holding circuit maintaining the energization of the coils 76 of relay 65 as long as there is disalignment between gyroscope and compass and one or the other of the relays 30, 31 of the compass amplifier 23 is energized. As the rotor speed decreases, there is a corresponding decrease in the voltage generated in winding 61. Should this voltage fall below the drop-out voltage requirment of relay 104, this relay will become deenergized and the D. C. source will be disconnected from the rotor winding 60. Assuming that alignment has still not been attained, the rotor will continue to rotate freely at this lower speed being slowed down further only by windage and frictional losses. During this period the increased effect of the precession motors causes a rapid alignment between gyroscope and compass. When this alignment is attained, the resolver circuit will no longer supply a signal from its rotor winding 17 of signal transformer 20 and hence the compass amplifier and its associated discriminating relays 30, 31 will become deenergized thereby opening the energization circuit for the relay 65. At this point the relay 65 moves to its deenergized position where its normally closed contacts are closed and A. C. is again applied to the rotor to accelerate it to its normal operating speed.

If during the dynamic braking period of the rotor alignment is attained between the gyroscope 10 and compass 11 before the rotor has reached the predetermined speed level at which the D. C. source is disconnected therefrom, the resolver circuit will discontinue its signal supplied to the compass amplifier 23, and its associated relays will move to the deenergized position thereby causing the relay 65 to become deenergized. As the relay or switch 65 moves to its deenergized position under these conditions, the normally open contact 102 will open breaking the energizing circuit of the relay 104 from the rotor winding 61 thereby deenergizing the relay 104. Since both the relays 104 and 65 control the D. C. energization circuit for the rotor winding 69, either one will break this energization circuit. Upon such operation the normal A. C. energization circuit for the rotor windings 60, 61 will again be established and the rotor will accelerate to its normal operating speed, the apparatus returning to its normal operation.

Assume now the condition of the initial starting of the gyroscope. Under such circumstances all apparatus in the circuit would be under a normal deenergized position, and the power to the transformer 40, the compass amplifier 23 of the resolver system would be connected from the ship's source through switches not shown. The switch 56 for the resolver circuit would be in an unslaved position, that is the switch 56 would be open and this resolver circuit would be deenergized although power was available at the switch. As the transformer 40 is energized, A. C. will be applied to the gyroscope rotor and it will accelerate toward its normal operating condition. This period is commonly known as a warm-up. If there is a wide degree of disalignment between the compass and gyroscope, the slaving apparatus will be energized at this point through the switch 56. Since the time required for a gyro rotor to accelerate to its normal speed is usually quite long, the establishment of the resolver circuit at this point will effect a rapid rate of operation of the precession motor 21 in aligning the compass with the gyroscope. If, however, the alignment is not obtained before the gyroscope has acquired considerable momentum, the rate of aligment will be correspondingly decreased as the rotor speed increases. Therefore it may be desirable to engage the momentary switch 80 to disconnect the A. C. supply from the rotor and connect the D. C. source to the rotor winding 69 to effect a dynamic braking of the rotor holding the rotor speed down to the predetermined range in which the precession motors have the greatest effect. Should the gyro still not be aligned with the compass when the rotor reaches the predetermined speed range, the D. C. circuit will be disconnected and the rotor allowed to rotate freely until alignment is obtained.

In the event that alignment is not attained before the gyroscope loses its rigidity, that is where the gyroscope speed decreases to a point where the rotor has no longer a gyroscopic effect, then the resolver circuit must be deenergized through switch 56 to place the relays 65 and 104 in a deenergized position. Under such circumstances A. C. will again be applied to the gyro rotor and an acceleration period will again be resumed. Once the rotor has attained a speed with which it is stable, the apparatus of the subject invention may again be brought into play to effect a rapid alignment of the gyroscope with the rotor.

In considering this invention it should be kept in mind that the present disclosures intend to be illustrative only and the scope of the invention should be determined only by the appended claims.

I claim:

1. In combination, a gyroscope including a rotor and spinning means therefor for normally spinning said rotor at a predetermined speed, means for precessing the gyroscope, braking means for said rotor, manual means for initially rendering said braking means effective to reduce the speed of said rotor so as to decrease gyroscopic rigidity and increase the effect of operation of said precession means, and means responsive to a condition indicative of the rotor assuming a lower predetermined speed for automatically terminating the operation of said braking means.

2. In combination, a gyroscope including a rotor and spinning means therefor for normally spinning said rotor at a predetermined speed, means for precessing the gyroscope, means responsive to a first condition for controlling the operation of said precessing means to cause the gyroscope to assume a position related to said condition; braking means for said rotor, means for rendering said braking means effective to reduce the speed of said rotor and hence increase the effect of operation of said precession means, means for terminating operation of said braking means when the speed of said rotor is reduced to a predetermined extent, and means operative when said gyroscope assumes a position corresponding to said condition for causing the rotor speed to be restored to said predetermined speed.

3. In a gyro compass slaving apparatus, a compass, a directional gyro including a rotor with spinning means therefor and precession means for said gyro, differential energizing means responsive to angular displacement between said compass and said gyro for controlling said precession means, relay means controlled by said differential energizing means for controlling the energization of said spinning means of said rotor from an A. C. source, said relay means being initially energized through a manually initiated switch, second relay means connecting a D. C. source to said spinning means of said rotor when said first named relay means is operated to disconnect said A. C. source from said spinning means of said rotor, said second relay means being initially operated through said initiating switch and being maintained from a signal generated by said spinning means of said rotor means when energized from said D. C. source.

4. In a gyro compass slaving apparatus, a directional gyroscope having a spinning means and torque applying means for precessing said gyroscope, a compass, means including a relay means responsive to angular displacement between said compass and said gyroscope for controlling the energization of said torque applying means to precess said gyroscope into alignment with said compass, means selectively controlling the energization of said spinning means from an A. C. source or the energization of a portion of said spinning means from a D. C. source, and means adapted for manual operation to control the operation of said second named means.

5. In combination, a gyroscope including a rotor and a spinning means therefor, means mounted on said gyroscope for controllably positioning said rotor, a first circuit means responsive to a need for controlling said gyroscope to automatically control the operation of said rotor positioning means, a second circuit means energizing said spinning means of said rotor from an A. C. source, relay means establishing in one position said second circuit means, a third circuit means for energizing said spinning means from a D. C. source established through a second position of said relay means, and manual means for operating said relay means.

6. In apparatus of the class described, a gyroscope including a rotor and a spinning means therefor, means mounted on said gyroscope for controllably positioning said rotor, a first circuit means responsive to a need for controlling said gyroscope to automatically control the operation of said rotor positioning means, a second circuit means energizing said spinning means of said rotor from an A. C. source, relay means establishing in one position said second circuit means, and a third circuit means adapted to be so energized as to cause braking of said rotor to a predetermined speed, said third circuit means being established through a second position of said relay means by a manual switching means and being maintained only when said spinning means is rotating above said predetermined speed, said manual switching means being effective to operate said relay means only upon a need for control of said gyroscope.

7. In apparatus of the class described, a gyroscope including a rotor and a spinning means therefor, means mounted on said gyroscope for controllably positioning said rotor, a first circuit means responsive to a need for controlling said gyroscope to automatically control the operation of said rotor positioning means, a second circuit means energizing said spinning means of said rotor from an A. C. source, relay means establishing in one position said second circuit means, a third circuit means for energizing said spinning means from a D. C. source being established through a second position of said relay means, manual means for operating said relay means, and a fourth circuit means maintaining said third circuit means established only when said spinning means is rotating above a predetermined speed.

8. In apparatus of the class described, a gyroscope including a rotor and a spinning means therefor, means mounted on said gyroscope for controllably positioning said rotor, a first circuit means responsive to a need for controlling said gyroscope to automatically control the operation of said rotor positioning means, a second circuit means energizing said spinning means of said rotor from an A. C. source, relay means establishing in one position said second circuit means, a third circuit means adapted to be so energized as to cause braking of said rotor to a predetermined speed, said third circuit means being established through a second position of said relay means by a manual switching means, said manual switching means operating said relay means only upon a need for control of said gyroscope, and a fourth circuit means maintaining said third circuit means established only when said spinning means is rotating above said predetermined speed.

9. In a gyro compass slaving apparatus, a directional gyroscope having a spinning means and torque applying means for precessing said gyroscope, a compass, means including a relay means responsive to angular displacement between said compass and said gyroscope for controlling the energization of said torque applying means to precess said gyroscope into alignment with said compass, means selectively controlling the energization of said spinning means from an A. C. source or the energization of a portion of said spinning means from a D. C. source, and means adapted for manual operation and effective upon the need for operation of said torque applying means to control the operation of said second named means, said torque applying means becoming more effective to precess said gyroscope into alignment with said compass when said D. C. source is applied to said spinning means.

10. In a compass slaving apparatus for a gyroscope, a directional gyroscope including a rotor having a spinning means and a torque applying means for precessing said rotor in azimuth, a compass including a signal transmitter for slaving said rotor in azimuth, a signal receiver mounted on said gyroscope and connected to said signal transmitter for resolving angular displacement between said compass and said gyroscope and producing a signal proportional to said angular displacement, means including a first relay means responding to said signal from said signal receiver for controlling the direction of energization of said torque applying means for precessing said gyroscope rotor into alignment with said compass, a second relay means for connecting and disconnecting said spinning means of said rotor to an A. C. source controlled by said first relay means, manual switch means for initiating the operation of said second relay means to disconnect said A. C. source from said spinning means of said rotor, third relay means for connecting a D. C. source to said spinning means of said rotor controlled by said manual switching means, holding circuit means for maintaining said second relay energized on continued operation of said first relay means, and a second holding circuit means including said second relay means for connecting said third relay means to said spinning means of said rotor, the energization of said third relay means from said spinning means of said rotor being dependent upon the rotation of said rotor.

11. In combination, a gyroscope including a rotor and a spinning means therefor, means mounting said rotor and said spinning means for displacement about a pair of mutually perpendicular axes, means mounted on said rotor mounting for applying a torque to said rotor about one of said axes for controlling the position of said rotor about the other of said axes, a first electric circuit means responsive to the need for controlling said rotor about the other of said axes to automatically control the operation of said torque applying means, a second electric circuit means for controlling the operation of said spinning means of said rotor to provide for increased effectiveness of said torque applying means, and manual means for initiating said second electric circuit means, said second electric circuit means being effective only upon a need for control of said rotor about the other of said axes.

12. In combination, a gyroscope including a rotor and a spinning means therefor, means mounting said rotor and said spinning means for displacement about a pair of mutually perpendicular axes, means mounted on said rotor mounting means for applying a torque to said rotor about one of said axes for controlling the position of said rotor about the other of said axes, a first electric circuit means responsive to the need for controlling said rotor about the other of aid axes to automatically control the operation of said torque applying means, and manually initiated second circuit means for reducing the speed of said spinning means of said rotor to provide for increased effectiveness of said torque applying means.

13. In combination, a gyroscope including a rotor and a spinning means therefor for normally spinning said rotor at a predetermined speed, means for precessing said gyroscope, means for reducing the speed of said rotor, manual means for initially rendering said speed reducing means of said rotor effective to reduce the speed of said rotor so as to decrease gyroscopic rigidity and increase the effect of operation of said precession means, and means responsive to a condition indicative of the rotor assuming a lower predetermined speed for automatically terminating the operation of said speed reducing means.

WAYNE A. STONE.

REFERENCES CITED

The following references are of record in the file of this patent:

UNITED STATES PATENTS

| Number | Name | Date |
|---|---|---|
| 1,560,428 | Myers | Nov. 3, 1925 |
| 1,640,549 | Lamme | Aug. 30, 1927 |
| 2,161,241 | Bates | June 6, 1939 |
| 2,344,126 | Carlson | Mar. 14, 1944 |
| 2,524,756 | Braddon et al. | Oct. 10, 1950 |

FOREIGN PATENTS

| Number | Country | Date |
|---|---|---|
| 591,598 | Great Britain | Aug. 22, 1947 |